(12) United States Patent
Mead

(10) Patent No.: US 6,417,910 B1
(45) Date of Patent: Jul. 9, 2002

(54) SYSTEM AND METHOD FOR DYNAMICALLY SYNCHRONIZING AN INTEGRAL DIGITAL SOUNDTRACK WITH A SEQUENCE OF IMAGES IN MOTION PICTURE MEDIA

(75) Inventor: William H. Mead, Los Angeles, CA (US)

(73) Assignees: Sony Corporation (JP); Sony Electronics Inc.

( * ) Notice: Subject to any disclaimer, the term of this patent is extended or adjusted under 35 U.S.C. 154(b) by 0 days.

(21) Appl. No.: 09/709,664

(22) Filed: Nov. 9, 2000

Related U.S. Application Data

(63) Continuation of application No. 09/097,348, filed on Jun. 15, 1998.

(51) Int. Cl.[7] .............................................. G03B 31/00
(52) U.S. Cl. ................................. 352/12; 352/7; 352/8
(58) Field of Search ............................. 352/3, 7, 8, 12, 352/16, 20, 21; 348/512, 515; 360/13, 61; 369/70

(56) References Cited

U.S. PATENT DOCUMENTS

| | | | | |
|---|---|---|---|---|
| 4,461,552 A | * | 7/1984 | Levine | 352/27 |
| 4,600,280 A | | 7/1986 | Clark | 352/37 |
| 4,703,355 A | * | 10/1987 | Cooper | 348/512 |
| 4,839,733 A | | 6/1989 | Karamon et al. | 386/97 |
| RE33,535 E | * | 2/1991 | Cooper | 348/512 |
| 5,055,939 A | | 10/1991 | Karamon et al. | 386/97 |
| 5,155,510 A | * | 10/1992 | Beard | 352/27 |
| 5,202,761 A | * | 4/1993 | Cooper | 348/515 |
| 5,271,022 A | * | 12/1993 | Berlekamp et al. | 714/755 |
| 5,327,182 A | * | 7/1994 | Kohut et al. | 352/27 |
| 5,450,146 A | * | 9/1995 | Chedeville et al. | 352/31 |
| 5,710,752 A | * | 1/1998 | Seagrave et al. | 369/97 |
| 5,751,398 A | * | 5/1998 | Beard | 352/236 |
| 5,841,513 A | * | 11/1998 | Yoshimura et al. | 352/27 |
| 6,211,940 B1 | * | 4/2001 | Seagrave et al. | 352/11 |

FOREIGN PATENT DOCUMENTS

JP  10010657  1/1998

OTHER PUBLICATIONS

US 5,175,574, 12/1992, Beard (withdrawn)

* cited by examiner

*Primary Examiner*—Russell Adams
*Assistant Examiner*—Rodney Fuller
(74) *Attorney, Agent, or Firm*—Fulwider Patton Lee & Utecht, LLP

(57) ABSTRACT

In a system and method for dynamically synchronizing a digital soundtrack with a moving picture in motion picture media, the system includes a device for presenting the motion picture media, wherein the motion picture media further includes an analog soundtrack. The digital soundtrack further includes a variable delay to compensate for the distance between a frame in the moving picture and a portion of the digital soundtrack corresponding thereto. A synchronizing device is correlated to a digital soundtrack pickup and an analog soundtrack picture in a feedback loop. A processor in the synchronizing device is adapted to process the digital soundtrack and the analog soundtrack to generate a control signal based on the difference between the location of a transient reference in the analog soundtrack and the same transient in the digital soundtrack, and to use the control system to adjust the variable delay in the digital soundtrack for synchronization thereof.

28 Claims, 2 Drawing Sheets

SYSTEM AND METHOD FOR DYNAMICALLY SYNCHRONIZING AN INTEGRAL DIGITAL SOUNDTRACK WITH A SEQUENCE OF IMAGES IN MOTION PICTURE MEDIA

RELATED APPLICATIONS

This application is a continuation of application Ser. No. 09/97,348, filed Jun. 15, 1998.

BACKGROUND OF THE INVENTION

1. Field of the Invention

This invention relates generally to improvements in media sound playback systems, and, more particularly, to a new and improved system and method for dynamically synchronizing a digital soundtrack with a moving picture in motion picture media which includes a reference analog soundtrack, whereby the digital soundtrack plays back in synchronization with the moving picture for efficient and effective media sound playback.

2. Description of the Related Art

Digital sound has become an important part of the movie business, because of the high quality of reproduction which it provides.

Initially, analog sound was the only sound available for a movie. Analog sound in the movie business has made limited progress over the years, to being essentially marginally acceptable with relatively low quality sound provided thereby. The technical capabilities of the media for carrying analog sound were very limited, and did not meet the needs of the filmgoing public as well as the exhibitors to keep people coming to the theaters. In analog systems, there are two tracks in the film which play back in the theaters as four channels using a matrix encoding technology similar to quadrophonic sound to reproduce more channels than there actually are in the film, and similar in approach to stereophonic sound.

With the advent of digital sound in recent years, the digital sound provides a much greater dynamic range, representing a quality improvement over analog sound, in that the quiet movements are truly quiet, the loud moments may become very loud, and there are more surround channels including sub-woofer channels to support sounds such as for example very low frequency explosions.

At first, digital sound was an add-on to existing analog sound systems. The digital sound system included digital processing equipment including a digital reader to be mounted on the projector, and a separate digital processing box which fed digital sound to the amplifiers and to the loudspeakers. The only interface between the digital and analog systems was an automatic switch from the digital sound to the lower quality analog sound if there was a loss of digital sound, to provide continuous sound.

Presently, digital sound systems and analog sound systems are integrated with the speaker systems in many theaters. However, problems may arise even if there is no loss of the digital soundtrack, for example where the digital soundtrack loses synchronization with the moving picture while the movie is being shown, which would prevent movie-goers from enjoying the movie. This condition may arise for any one of a number of reasons.

The analog and digital soundtracks may be placed on the same film at different locations relative to each other, and at different locations relative to the location of the moving picture, to compensate for the locations of the analog and digital sound pickups relative to the picture gate and the lamphouse for projecting the moving picture. The digital soundtrack may be recorded in the film with a delay to compensate for the location of the digital sound pickup ahead of the location of the picture gate and the lamphouse, and to compensate for the distance between the digital sound pickup and the picture gate and the lamphouse. The delay initially synchronizes the digital soundtrack with the moving picture.

However, errors may be introduced in the pickup of the digital soundtrack which would cause loss of synchronization with the moving picture. The projectionist may thread the film in the projector in such a way that the digital soundtrack may be out of synchronization, by making the loop in the film too big or too small, which would change the distance of film travel between the digital sound pickup and the picture gate and lamphouse. Further, the design of the specific projector utilized may vary the distance between the digital sound pickup and the picture gate and lamphouse. Also, projectionists may not thread the film through all of the digital sound pickups associated with a projector, in systems wherein each pickup is adapted to function with one of a plurality of digital soundtrack formats. Errors may also occur in processing multiple prints of a film, causing the digital soundtrack to lose synchronization with the moving picture.

In view of these considerations, an effective operational system should be implemented in a motion picture projecting system for the dynamic synchronization of the digital soundtrack with the moving picture.

Therefore, those concerned with the development and use of digital sound in motion pictures have recognized the need for improved systems and methods for synchronizing the high quality digital soundtrack with the moving picture in a motion picture film, such that moviegoers may fully enjoy the experience of viewing a film without the disruption thereof caused by a loss of synchronization. Accordingly, the present invention fulfills these needs by providing efficient and effective dynamic synchronization of the digital soundtrack with the moving picture for an enhanced moviegoing experience and increased patron enjoyment.

SUMMARY OF THE INVENTION

Briefly, and in general terms, the present invention provides a new and improved system and method for dynamically synchronizing a digital soundtrack with a moving picture in an efficient and effective manner, while enhancing the viewing experience for the moviegoer at a motion picture theater. The system provides dynamic synchronization of the digital soundtrack by using an analog soundtrack in the same media as a reference, for effective synchronization thereof.

By way of example, and not by way of limitation, the present invention provides a new and improved system and method for dynamically synchronizing the digital film soundtrack from a transient in the digital and analog soundtracks.

More particularly, the present invention includes motion picture media including a moving picture, a digital soundtrack, and an analog soundtrack, and means for presenting the motion picture media. The system in accordance with the present invention further includes means for dynamically synchronizing the digital soundtrack and the moving picture with the analog soundtrack as a reference therefor. This is accomplished automatically through a feedback loop which generates a control signal from correlated information in the digital and analog soundtracks and adjusts a variable delay in the digital soundtrack responsive thereto.

Therefore, one advantage of the present invention is that it includes a system for effectively synchronizing the digital soundtrack with the moving picture in motion picture media.

A further advantage is that the present invention provides dynamically synchronizes the digital soundtrack with the moving picture while the motion picture media is being presented by the projecting device.

Another advantage is that of the present invention provides automatic synchronization of the digital soundtrack and the moving picture upon loss of synchronization while the motion picture media is being presented by the projecting device.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

The present invention is directed to an improved system and method for dynamically synchronizing a digital soundtrack with a moving picture in an efficient and effective manner. The improved system and method provides synchronization of the moving picture and digital soundtrack responsive to a reference analog soundtrack, dynamically in real time while the moving picture is being presented on a screen, and wherein the digital soundtrack is in the same media as the analog soundtrack and the moving picture.

Figure 1:
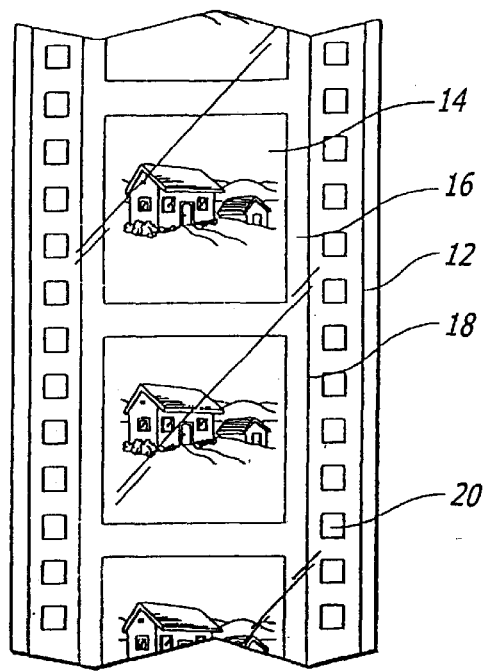
FIG. 1 is a fragmentary view of motion picture media which includes a digital soundtrack, an analog soundtrack, and a moving picture therein.
Figure 2:
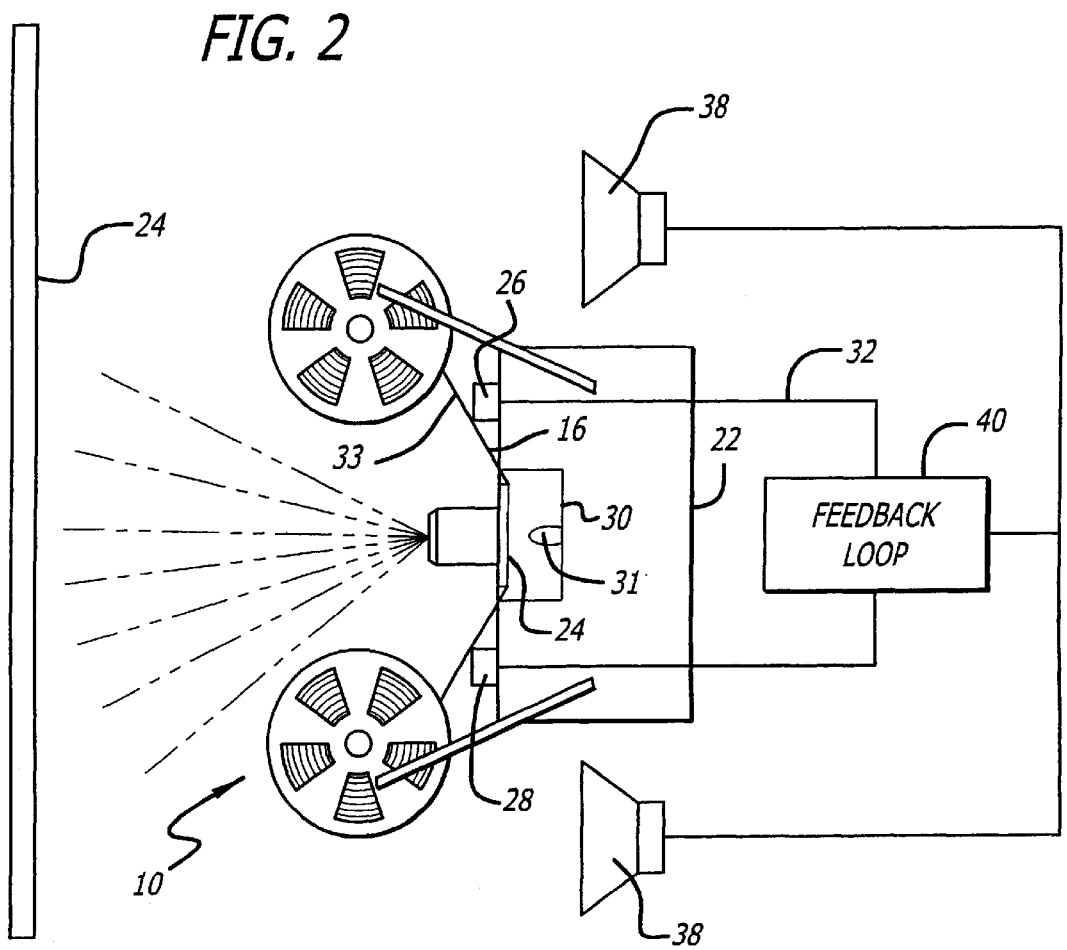
FIG. 2 is a partly representational partly block diagram of a dynamically synchronizing media presenting system in accordance with the present invention.

Referring now to the drawings, wherein like reference numerals denote like or corresponding parts throughout the drawing figures, and particularly to FIGS. 1 and 2, a system 10 is utilized for dynamically synchronizing a digital soundtrack 12 with a moving picture 14 in a motion picture media 16 such as a movie film, using a corresponding analog soundtrack 18 on the media 16 as a reference. The media 16 may further include sprocket perforations 20 for enabling the threading thereof into a device 22 for presenting the moving feature 14 on a screen 24. The presenting device 22 may comprise for example a motion picture projector. The system 10 further includes a device 26 for picking up the digital soundtrack 12, and a device 28 for picking up the analog soundtrack 18, which are associated with the presenting device 22.

As shown in FIG. 2, the presenting device 22 includes an assembly 30 for projecting the moving picture 14 onto the screen 24. The projecting assembly 30 includes a picture gate and a lamphouse including a lamp and a lens assembly. The presenting device 22 further includes a plurality of rollers, takeup rollers, and sprocket wheels (not shown) through which the media 16 is threaded, which define a path of movement 33 for transporting the media 16 through the projecting device 22.

In accordance with the present invention, the system 10 also includes a device 34 for synchronizing the digital soundtrack 12 with the moving picture 14. The synchronization device 34 includes a processor 36 and software for processing digital signals, and is connected through the feedback loop 40 to the digital soundtrack pickup device 26, the analog soundtrack pickup device 28, and a speaker system 38, for broadcasting the digital soundtrack 12 and showing the moving picture 14 in synchronization therewith.

Figure 3:
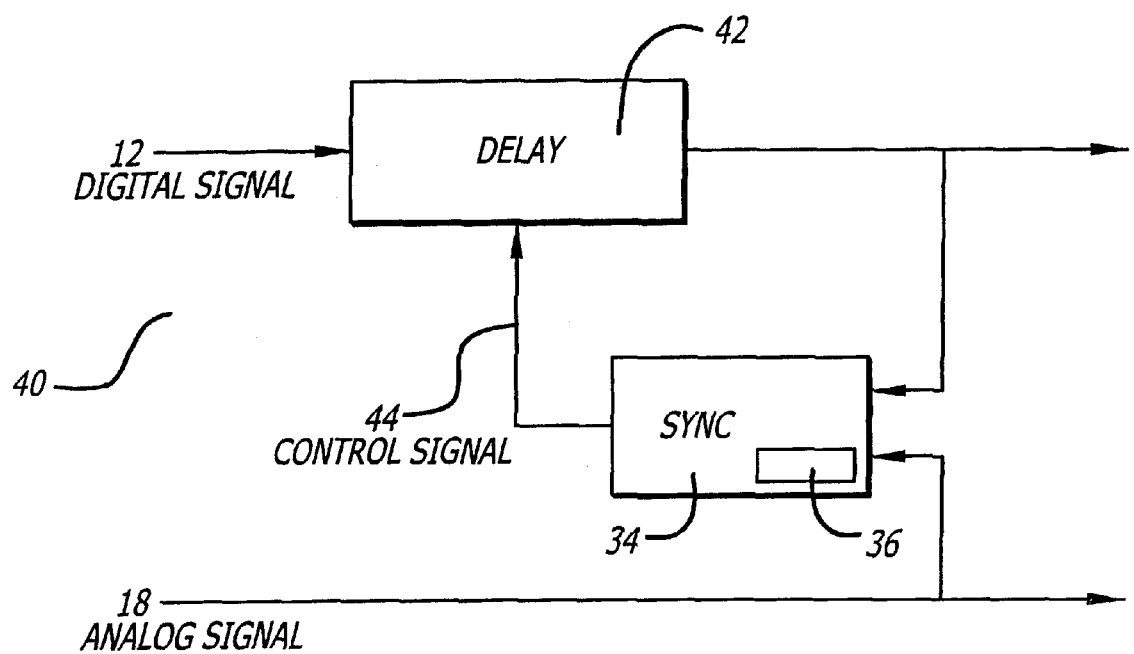
FIG. 3 is a block diagram of a feedback loop for dynamic synchronization in the practice of the present invention.

As seen in FIG. 3, the system 10 further includes a feedback loop 40, wherein the digital soundtrack 12, which is processed through a variable delay 42 which delays the pickup of the digital soundtrack 12, is fed back through the synchronizing device 34 along with the analog soundtrack 18, and is processed through the synchronizing device 34 to generate a control signal 44 for controlling the variable delay 42. The variable delay 42 is adapted to compensate for the location of the digital sound pickup 26 ahead of the projecting assembly 30 for projecting the moving picture 14, and is variable responsive to the control signal 44.

The synchronization device 34 is adapted to detect a selectable reference which is common to the digital soundtrack 12 and the analog soundtrack 18. The reference may preferably comprise for example a transient element comprising a discrete sound-generating event in the media 16.

As illustrated in FIG. 1, the analog soundtrack 16 may be placed on the media 16 at a location thereon for example inside the sprocket perforations 20. The digital soundtrack 12 may be placed on the media 16 at a location thereon not otherwise used, such as for example in the edges of the media 16 outside the sprocket perforations 20. The analog soundtrack 16 may be recorded on the media 16 at a location ahead of the moving picture 14 thereon, for example at a standard location for thirty-five millimeter film of twenty frames ahead of the moving picture 14. The analog soundtrack 16 may then be picked up by the analog soundtrack pickup device 28, at a location thereof for example at a standard distance after the projecting assembly 30 in the path of movement 32 of the media 16 through the presenting device 22, to synchronize the analog soundtrack 18 with the moving picture 14. The digital soundtrack 12 may be recorded on the media 16 with a delay relative to the moving picture 14, and may then be picked up by the digital soundtrack pickup device 26 at the location thereof ahead of the projecting assembly 30 in the path of movement 32 of the media 16 through the presenting device 22, to initially synchronize the digital soundtrack 12 with the moving picture 14. The digital soundtrack 12 may then be synchronized with the moving picture 14 at the location where the media is to be presented, such as in an auditorium in a movie theater, by an installer by running a film, listening by headphones or in the auditorium, and adjusting the variable delay forward or backwards until synchronization is heard in the auditorium. The adjustment may be made in hardware by rotating a thumbled-wheel switch or in software on a laptop computer, to set the variable delay to the length of the path 32.

After the delay is set and adjusted, a projectionist may introduce errors in installing a media 16 in a presenting device 22 for a particular show in a way which may cause the digital soundtrack 12 to be out of synchronization with the moving picture 14. In threading the media 16 into the projecting device 22, the projectionist may so configure the media 16 that the digital soundtrack 12 may be out of synchronization relative to the moving picture 14. The projectionist may for example make a loop in the media 16 either too big or tightened too much, which would change the length of the path 32, for example to the extent of one or two frames in the media 16. Such a path change would throw the digital soundtrack 12 and the moving picture 14 out of synchronization. Also, the distance in the presenting device 22 between the digital soundtrack pickup device 26 and the projecting assembly 30 may vary depending upon the specific equipment, and may in particular for example vary from one foot to three or four feet because of the design thereof, which may also result in the loss of synchronization of the digital soundtrack 12 and the moving picture 14.

Further, the media 16 presently may include any of a plurality of different formats of the digital soundtrack 12, and the presenting device 22 may include a plurality of digital soundtrack pickup devices 26 associated therewith which have the capability of showing the different digital soundtrack formats. Projectionists may forget to thread the media 16 through all such digital soundtrack pickup devices 26, or may thread only one such device 26 which changes the length of the path 32 between the digital soundtrack pickup device 26 and the projecting assembly 30 which may also cause the digital soundtrack 26 to be out of synchronization. Aside from projectionist error, processing errors may occur, which may cause the digital soundtrack 12 to be placed on the media 16 at an unintended place, for example either slightly ahead or slightly behind where it should be relative to the moving picture 14. Such processing errors may include for example errors in laying up the digital soundtrack 12 in printing up the negative from one print of the media 16 to another. Also, uncertainty over where the absolute start mark may be located, such as a blip which may be in the wrong place relative to the digital soundtrack 12.

In the present invention, the synchronization device 34 herein is adapted to adjust the digital soundtrack delay 42 while the media 16 is being presented by the presenting device 22, to dynamically synchronize the digital soundtrack 12 with the moving picture 14 where both are embedded in the same media 16. The synchronization device 34 uses the analog soundtrack 18 as a guide reference, dynamically comparing thereto the same information in the digital soundtrack 12. The correlated information in the media 16, comprising the reference information in the analog soundtrack 18 and the same information in the digital soundtrack 12, may comprise a specific transition or the like constituting a signal with a unique characteristic, such as for example changes, pulses, a door slamming, a person starting to speak, a spoken syllable, an explosion or a gunshot. The analog soundtrack 18 and the digital soundtrack 12 are generally highly correlated, since both support the same movie and dialog.

In particular and in accordance with the present invention, the processor 36 in the synchronization device 34 is adapted to examine the content of the analog soundtrack 18 and the digital soundtrack 12 and derive a control signal 44 from both soundtracks which represents the correlated information of a transient nature. The derived control signal 44 constitutes an error signal which is either plus or minus depending upon how the correlated information differs, and responsive thereto the synchronization device 34 dynamically adjusts and controls the variable delay line 42 between the digital sound pickup 26 and the projecting assembly 30 to synchronize the digital soundtrack 12 and the moving picture 14.

In accordance with the present invention, the processor 36 analyzes the transients in the soundtrack and may generate for example a characteristic mathematical signal constituting an error control signal 44 which may for example comprise a plus or minus voltage, which controls the variable delay line 42 to minimize the error signal, comprising a feedback loop 40. For example, if a signal is found in the analog soundtrack 18, and the same signal is found in the digital soundtrack 12 within one second thereafter, the assumption would be that the digital soundtrack 12 was running behind the analog soundtrack 18, and a control signal comprising an error signal could be generated that would change the variable delay line 42 to move the digital soundtrack back to minimize the error. The present invention provides improved systems and methods for synchronization of errors which manifest themselves throughout the showing of a film unless corrected. The synchronization device 34 is adapted to make an adjustment once for each showing of a film, usually within a short period of time of the beginning of the presentation of the film, such as for example within the first few seconds. The adjustment is implemented within the time it takes to make the calculation, generate the error signal, and correct the error, which would also be dependent upon the types of transitions in the film.

In accordance with the present invention, the system and method provide for dynamic synchronization in real time of the digital soundtrack with the moving picture while the moving picture is being projected onto a screen, using the analog soundtrack as a reference.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A system for synchronizing a digital soundtrack and a moving picture dynamically, when the digital soundtrack and the moving picture become out of synchronization, in a system which includes a projector for projecting the moving picture, and for detecting the digital soundtrack and an analog soundtrack from motion picture media which includes a moving picture, a digital soundtrack, and an analog soundtrack therein, wherein the projector includes a path of movement of the motion picture media therethrough, a projecting element for projecting the moving picture at a location in the path of movement, a digital soundtrack detector for detecting the digital soundtrack at a location before the location of the projecting element in the path of movement, and an analog soundtrack detector for detecting the analog soundtrack at a location after the location of the projecting element in the path of movement, comprising:

a dynamically synchronizing element for dynamically synchronizing the digital soundtrack with the moving picture in the motion picture media dynamically through the use of the analog soundtrack as a reference therefor, when the digital soundtrack and the moving picture become out of synchronization, which comprise a controlled feedback element for providing controlled feedback of the digital soundtrack and the analog soundtrack, so as to dynamically synchronize the digital soundtrack with the analog soundtrack.

2. The system of claim 1, wherein the dynamically synchronizing element includes a processing element for processing the digital soundtrack and the analog soundtrack.

3. The system of claim 1, wherein the motion picture media comprises a motion picture film.

4. The system of claim 1, wherein the digital soundtrack comprises a digital signal, and the analog soundtrack comprises an analog signal, and the controlled feedback element is adapted to generate a digital feedback signal from the digital signal, and an analog feedback signal from the analog signal.

5. The system of claim 1, wherein the dynamically synchronizing element automatically synchronizes the digital soundtrack with the moving picture dynamically while presenting the motion picture media in the projector.

6. The system of claim 1, wherein the projector comprises elements for enabling the moving picture to be projected onto a screen.

7. The system of claim 2, wherein the digital soundtrack includes a variable delay therein relative to the moving picture, the analog soundtrack includes a reference selectable therein and the digital soundtrack includes a corresponding reference selectable therein, and the processing element comprises a detecting generating element for detecting the selected analog soundtrack reference, the selected digital soundtrack reference, and the difference therebetween so as to generate a control signal derived therefrom, and for adjusting the digital soundtrack variable delay responsive to the control signal generated, so as to synchronize the digital soundtrack and the moving picture.

8. The system of claim 4, wherein the controlled feedback element includes a synchronizing element for synchronizing the digital feedback signal and the analog feedback signal to generate a control signal.

9. The system of claim 7, wherein the selectable analog soundtrack reference and the corresponding selectable digital soundtrack reference comprise a transient element in the motion picture media.

10. The system of claim 7, further comprising a feedback loop which includes the digital soundtrack including the delay therein, the analog soundtrack, the synchronizing element including the processing element, and the control signal.

11. The system of claim 8, wherein the synchronizing element includes a processing element for processing the digital feedback signal and the analog feedback signal.

12. The system of claim 8, wherein the controlled feedback element further includes a delaying element for delaying the digital signal in response to the control signal.

13. The system of claim 9, wherein the transient element comprises a discrete sound-generating event in the motion picture media.

14. The system of claim 9, wherein the synchronizing element is further adapted to analyze the transient element and generate characteristic signals therefrom, and wherein the error signal comprises the difference between the locations of the transient element characteristic signals in the analog soundtrack and the digital soundtrack.

15. A method of synchronizing a digital soundtrack and a moving picture dynamically, when the digital soundtrack and the moving picture become out of synchronization, in a system which includes a projector for projecting the moving picture and for detecting the digital soundtrack and an analog soundtrack from motion picture media which includes a moving picture, a digital soundtrack and an analog soundtrack therein, wherein the projector includes a path of movement of the motion picture media therethrough, a projecting element for projecting the moving picture at a location in the path of movement, a digital soundtrack detector for detecting the digital soundtrack at a location before the location of the projecting element in the path of movement, and an analog soundtrack detector for detecting the analog soundtrack at a location after the location of the projecting element in the path of movement, wherein the system comprises a dynamically synchronizing element for synchronizing the digital soundtrack with the moving picture in the motion picture media dynamically through the use of the analog soundtrack as a reference therefor, when the digital soundtrack and the moving picture become out of synchronization, which comprise a controlled feedback element for providing controlled feedback of the digital soundtrack and the analog soundtrack so as to dynamically synchronize the digital soundtrack with the analog soundtrack, wherein the method comprises:

presenting the motion picture media through movement thereof through the path of movement in the system, including detecting the digital soundtrack, projecting the moving picture, and detecting the analog soundtrack; and dynamically synchronizing the digital soundtrack with the moving picture through the use of the analog soundtrack as a reference therefor, when the digital soundtrack and the moving picture become out of synchronization, comprising providing controlled feedback of the digital soundtrack and the analog soundtrack so as to dynamically synchronize the digital soundtrack with the analog soundtrack.

16. The method of claim 15, wherein the dynamically synchronizing element includes a processing element for processing the digital soundtrack and the analog soundtrack, and the synchronizing step comprises processing the digital soundtrack and the analog soundtrack.

17. The method of claim 15, wherein the motion picture media comprises a motion picture film, the presenting step comprises presenting the motion picture film in the projector, and the synchronizing step comprises dynamically synchronizing the digital soundtrack with the motion picture film responsive to the analog soundtrack.

18. The method of claim 15, wherein the digital soundtrack comprises a digital signal, and the analog soundtrack comprises an analog signal, and the controlled feedback element is adapted to generate a digital feedback signal from the digital signal, and an analog feedback signal from the analog signal, and dynamically synchronizing includes generating a digital feedback signal from the digital signal, and an analog feedback signal from the analog signal.

19. The method of claim 15, wherein the dynamically synchronizing element automatically synchronizes the digital soundtrack with the moving picture dynamically while presenting the motion picture media in the projector, and the synchronizing step includes automatically synchronizing the digital soundtrack with the moving picture dynamically while presenting the motion picture media in the presenting means.

20. The method of claim 15, wherein the projector comprises elements for enabling the moving picture to be projected onto a screen, and the projecting step comprises projecting the motion picture onto a screen.

21. The method of claim 16, wherein the digital soundtrack includes a variable delay therein relative to the moving picture, the analog soundtrack includes a reference selectable therein and the digital soundtrack includes a corresponding reference selectable therein, and the processing element comprises a detecting generating element for detecting the selected analog soundtrack reference, the selected digital soundtrack reference, and the difference therebetween so as to generate a control signal derived therefrom, and for adjusting the digital soundtrack variable delay responsive to the control signal generated, so as to synchronize the digital soundtrack and the moving picture, and the synchronizing step comprises adjusting the digital soundtrack variable delay responsive to the control signal generated.

22. The method of claim 18, wherein the controlled feedback element includes a synchronizing element for synchronizing the digital feedback signal and the analog feedback signal to generate a control signal, and dynamically synchronizing includes synchronizing the digital feedback signal and the analog feedback signal to generate a control signal.

23. The method of claim 21, wherein the selectable analog soundtrack reference and the corresponding selectable digital soundtrack reference comprise a transient element in the motion picture media, and the synchronizing step comprises adjusting the digital soundtrack variable delay responsive to the difference between the analog soundtrack transient and the digital soundtrack transient.

24. The method of claim 21, further comprising a feedback loop which includes the digital soundtrack including the variable delay therein, the analog soundtrack, the synchronizing element including the processing element, and the control signal, wherein the synchronizing step comprises adjusting the digital soundtrack variable delay responsive to processing the digital soundtrack through the feedback loop.

25. The method of claim 22, wherein the synchronizing element includes a processing element for processing the digital feedback signal and the analog feedback signal, and synchronizing includes processing the digital feedback signal and the analog feedback signal.

26. The method of claim 22, wherein the controlled feedback element further includes a delaying element for delaying the digital signal in response to the control signal, and dynamically synchronizing includes delaying the digital signal in response to the control signal.

27. The method of claim 23, wherein the transient element comprises a discrete sound-generating event in the motion picture media, and the synchronizing step comprises adjusting the digital soundtrack variable delay responsive to the difference between the locations of the discrete sound-generating event in the analog soundtrack and in the digital soundtrack.

28. The method of claim 23, wherein the synchronizing element is further adapted to analyze the transient element and generate characteristic signals therefrom, and wherein the error signal comprises the difference between the location of the transient element characteristic signals in the analog soundtrack and the digital soundtrack, and the synchronizing step comprises adjusting the digital soundtrack variable delay responsive to the difference between the locations of the transient element characteristic signals in the analog soundtrack and the digital soundtrack.

* * * * *